United States Patent
Chen

(10) Patent No.: US 6,627,162 B1
(45) Date of Patent: Sep. 30, 2003

(54) APPARATUS FOR TREATING WASTE GAS FROM SEMICONDUCTOR MANUFACTURING PROCESS

(76) Inventor: Tsong-Maw Chen, PO Box 82-144, Taipei (TW)

( * ) Notice: Subject to any disclaimer, the term of this patent is extended or adjusted under 35 U.S.C. 154(b) by 0 days.

(21) Appl. No.: 09/575,234

(22) Filed: May 22, 2000

(51) Int. Cl.[7] ............................................... B01D 53/34
(52) U.S. Cl. ...................... 422/173; 422/169; 422/170; 422/171; 422/109; 422/205
(58) Field of Search ................................ 422/169–171, 422/109, 205

(56) References Cited

U.S. PATENT DOCUMENTS 5,855,822 A * 1/1999 Chen ........................... 261/118
5,997,824 A * 12/1999 Kim ............................ 422/171
6,153,150 A * 11/2000 Moore et al. ............... 422/173

* cited by examiner

*Primary Examiner*—Hien Tran
(74) *Attorney, Agent, or Firm*—Leong C. Lei

(57) ABSTRACT

An apparatus for treating waste gas from semiconductor manufacturing process includes a decomposition chamber having an inner wall and having a heater therein, a cleansing chamber and a waste water treating device; the inner wall of the decomposition chamber being mounted with a temperature sensor for servo control of the heater to operate at a constant temperature, and an aluminum foil layer to reflect heat to shorten decomposition time, the bottom end of the decomposition chamber being mounted with a detachable dust collector; the top section of the cleansing chamber being provided with a plurality of short metallic tubes to allow condensation of residual moisture of the discharged gas on the wall of the short metallic tubes, and the waste water treating device included a G-shaped tank mounted with a slurry removing device comprising a conveyor, a driving shaft, a driven shaft, a combing roller, a scrape board, and a speed-reducing motor, thereby precipitated slurries at the bottom of a storage tank is discharged.

5 Claims, 7 Drawing Sheets

APPARATUS FOR TREATING WASTE GAS FROM SEMICONDUCTOR MANUFACTURING PROCESS

BACKGROUND OF THE INVENTION (a) Technical Field of the Invention

The present invention relates to a waste gas treating device discharged from semiconductor manufacturing process, and in particular, a waste gas treating device which effectively cleans and removes the slurries deposited in the polluted water discharged from the semiconductor manufacturing process.

b) Description of the Prior Art

Many industrial fabrication processes, including semiconductor manufacturing processes, evolve waste gas that has to be treated before it is discharged to the environment. The generation of the waste gas has to be treated is to reduce the propensity of the waste gas to be corrosive to all parts of the manufacturing process system.

Taiwan Patent Application No. 86215502 relates to an improved structure of a waste gas treating device for semiconductor manufacturing process. The conventional art discloses (a) the charging of a gas stream ($N_2$) within the inner wall of the decomposition chamber to avoid the formation of dust accumulation at dead corners of the chamber and to increase decomposition process, and (b) mounting of a pressure regulatory valve in a cleansing chamber and supplying water absorbent within the chamber so as to reduce water moisture content in the discharged gas. However, there are shortcomings with respect to the waste gas treating process which need to be overcome.

Therefore, it is a main object of the present invention to provide an apparatus for treating waste gas from semiconductor manufacturing process which solves the drawbacks of the conventional device.

SUMMARY OF THE INVENTION

Accordingly, it is an object of the present invention to provide an apparatus for treating waste gas from semiconductor manufacturing process comprising a decomposition chamber having an inner wall and having a heater therein, a cleansing chamber and a waste water treating device; the inner wall of the decomposition chamber being mounted with a temperature sensor for servo control of the heater to operate at a constant temperature, and an aluminum foil layer to reflect heat to shorten decomposition time, the bottom end of the decomposition chamber being mounted with a detachable dust collector; the top section of the cleansing chamber being provided with a plurality of short metallic tubes to allow condensation of residual moisture of the discharged gas on the wall of the short metallic tubes, and the waste water treating device included a G-shaped tank mounted with a slurry removing device comprising a conveyor, a driving shaft, a driven shaft, a combing roller, a scrape board, and a speed-reducing motor, thereby precipitated slurries at the bottom of a storage tank is discharged.

Yet another object of the present invention is to provide an apparatus for treating waste gas from semiconductor manufacturing process, wherein the decomposition chamber comprises of two symmetrical portions which can be assembled, opened and locked, and the decomposition chamber is mounted on a fixing frame or supported by sliding rails.

A further object of the present invention is to provide an apparatus for treating waste gas from semiconductor manufacturing process, the end of the waste gas intake tube mounted to the decomposition chamber is connected to an anti-air explosion device.

The foregoing objects and summary provide only a brief introduction to the present invention. To fully appreciate these and other objects of the present invention as well as the invention itself, all of which will become apparent to those skilled in the ark the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
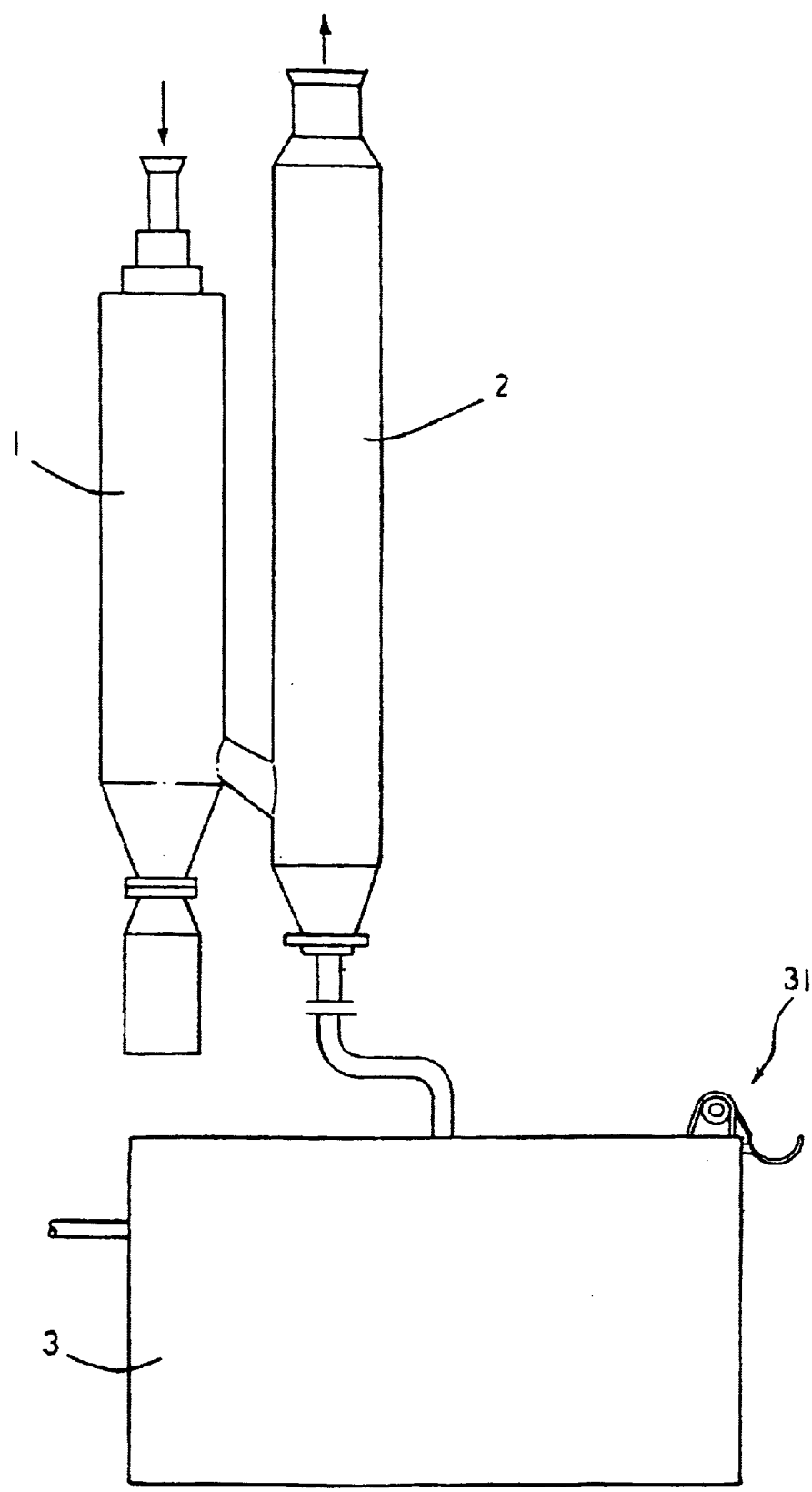
FIG. 1 is a schematic view showing the arrangement of the apparatus for treating waste gas in accordance with the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Hereinafter, a preferred embodiment of the present invention will be described with reference to FIGS. 1 to 9 of the attached drawings.

Figure 2:
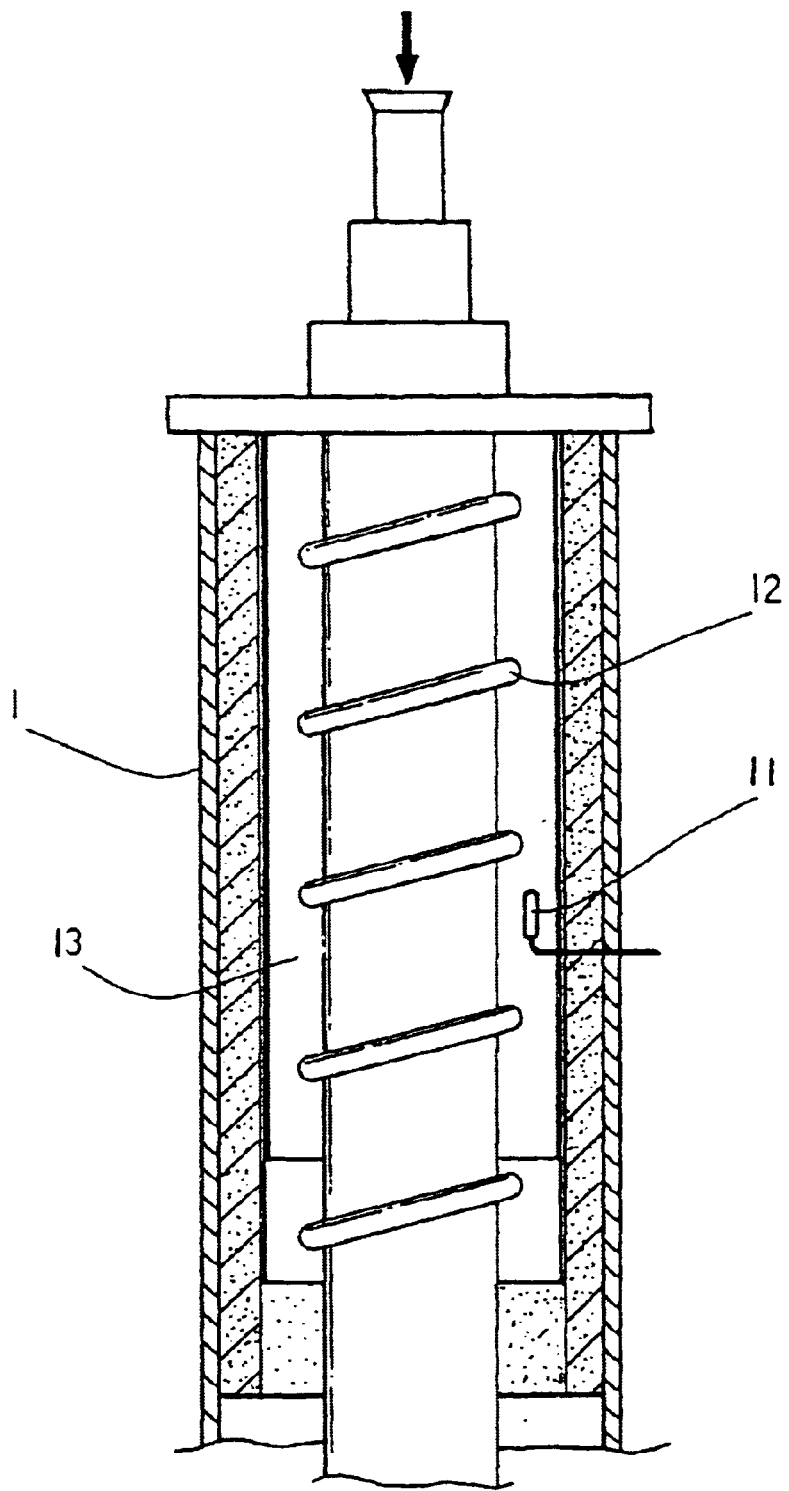
FIG. 2 is a schematic view showing the interior of the decomposition chamber in accordance with the present invention.
Figure 3:
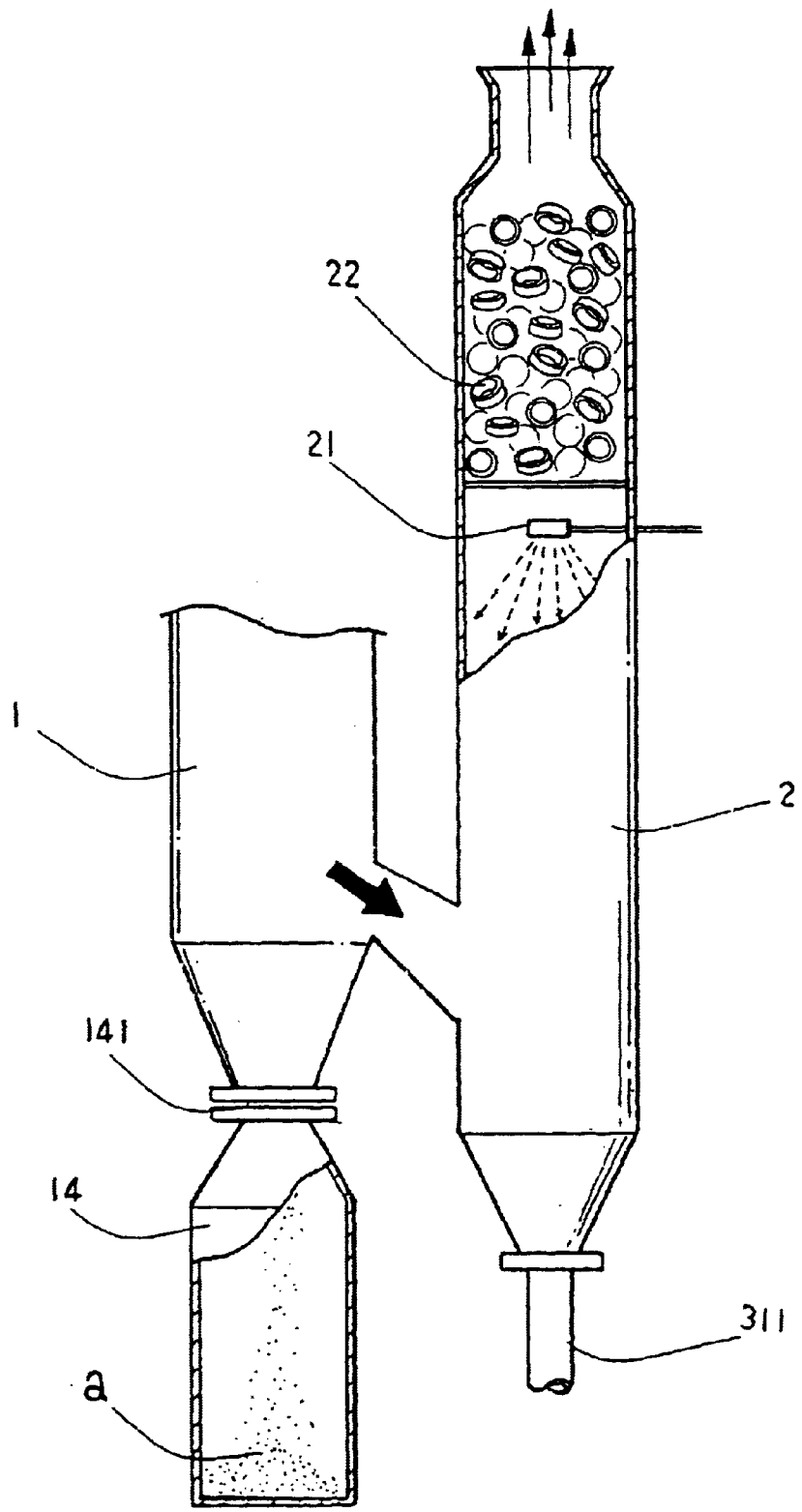
FIG. 3 is a schematic view showing the interior of the cleansing chamber in accordance with the present invention.

Referring to FIG. 1, there is shown an apparatus for treating waste gas from semiconductor manufacturing process comprising a decomposition chamber 1, a cleansing chamber 2, and a waste water treating device 3. Referring to FIG. 2, the inner wall of the decomposition chamber 1 is provided with a temperature sensor 11 for servo-control of a heater 12 disposed within the chamber 1 for constant temperature operation. An aluminum foil layer 13 is mounted along the inner wall of the chamber 1 to provide reflected heat within the chamber 1 which can shorten the heating time required during the decomposition, and reduce energy waste. The bottom end of the decomposition chamber 1 is mounted with a detachable dust collector 14 provided with a valve 141 for collection of granular dust a in the process of decomposition. Thus, there will be no dust accumulated at the bottom of the chamber 1 and it does not required to open out the entire chamber 1 for cleansing.

Referring again to FIG. 3, the top section, above the moisturizing nozzle 21, of the cleansing chamber 2, a plurality of short metallic tubes 22 are provided. The waste gas passes through the decomposition chamber 1 and enters the cleansing chamber 2. The waste gas is then purged by the moisture from the moisturizing nozzle 21 within the cleansing chamber 2. The remaining moisture in the gas passes through the short metallic tubes 22 and the moisture will be adsorbed at the wall surface of the tubes 22 and then discharged out from the chamber 2 to avoid condensation of moisture in venting tubes (not shown).

Figure 4:
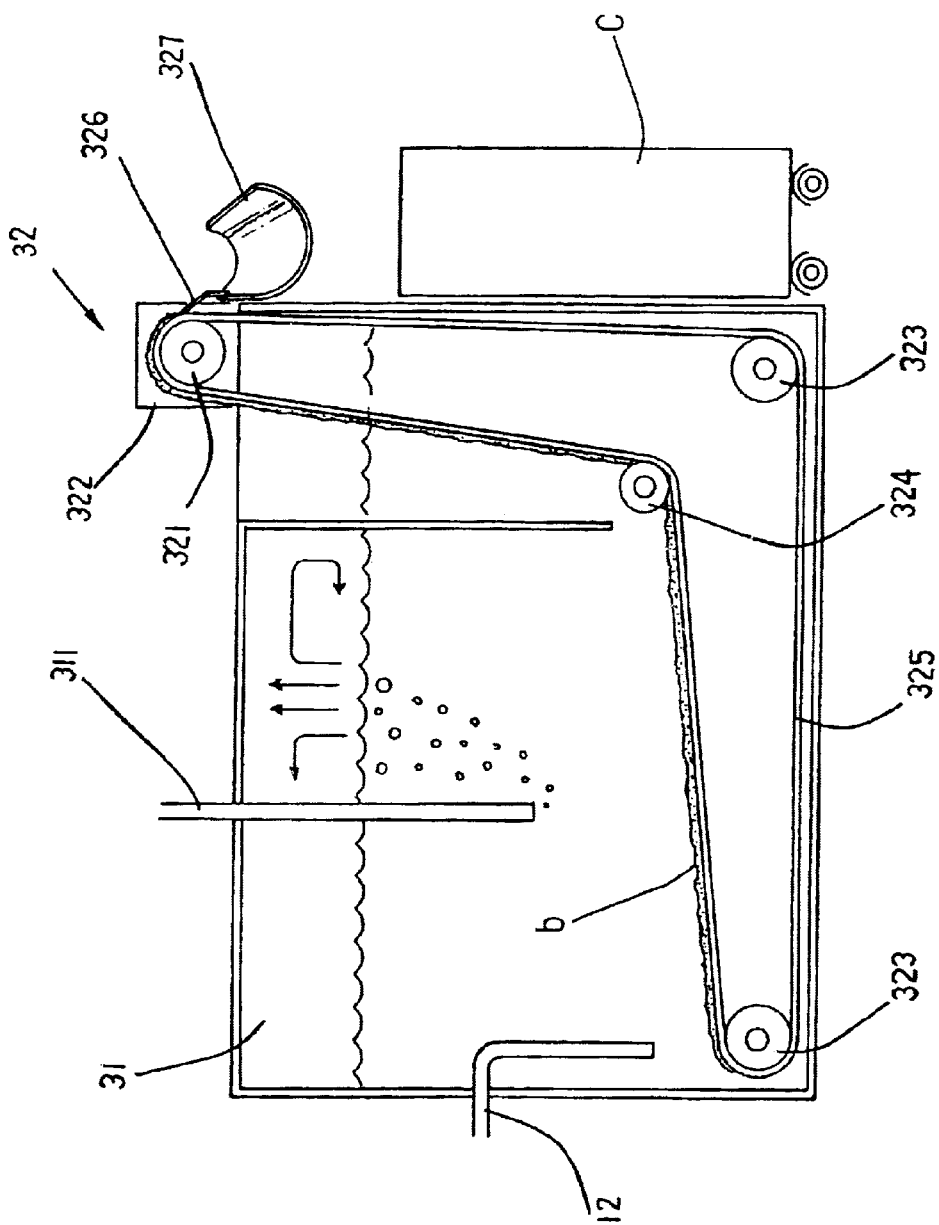
FIG. 4 is a waste water treating device of the preferred embodiment of the present invention.
Figure 5:
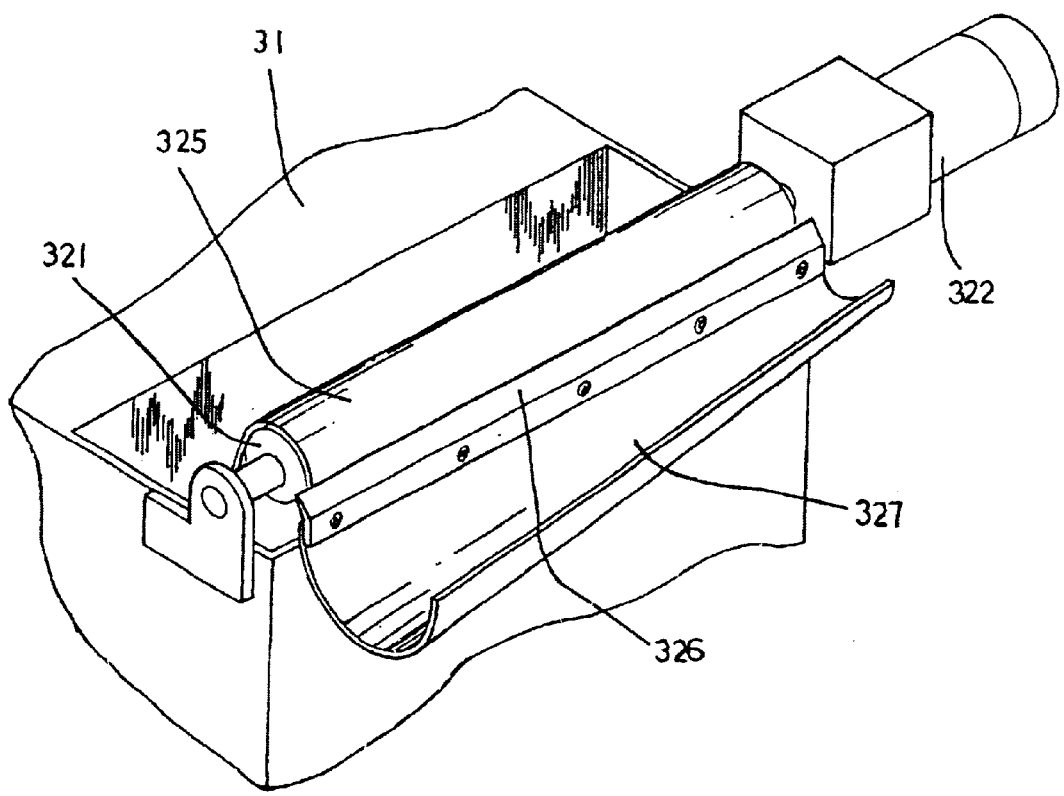
FIG. 5 is a partial perspective view of the driving shaft in combination with a scraping board in accordance with the present invention.
Figure 6:
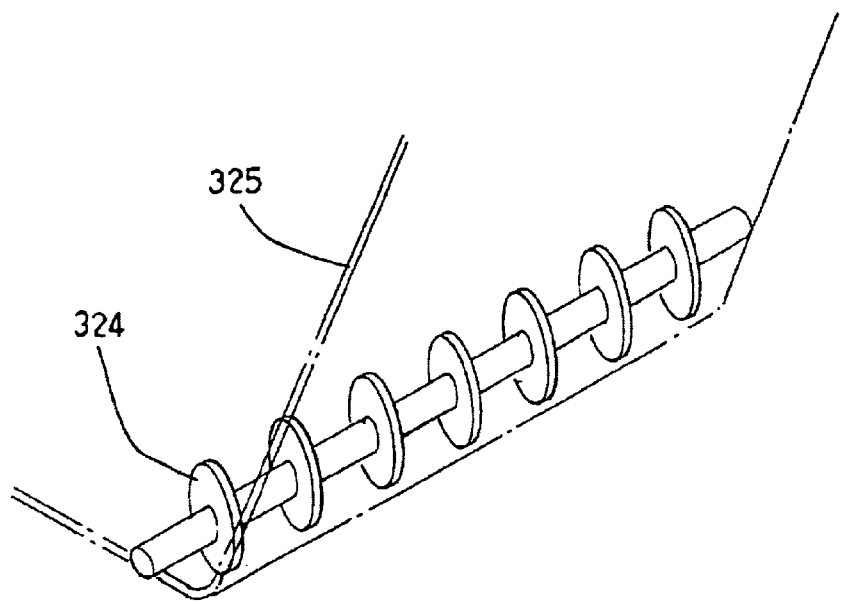
FIG. 6 is a perspective view of the combing roller in accordance with the preset invention.

Referring to FIGS. 4, 5 and 6, the waste water treating device 3 includes a G-shaped tank 31 and a slurry cleansing device 32 which are capable of isolating most of the waste gas from the polluted water. The G-shaped tank 31 is pivotally mounted with an intake tube 311 connected to the bottom end of the cleansing chamber 2 to hold the polluted water, and a discharging tube 312 is used to withdraw the storage water at a specific timing. A driving shaft 321 is mounted at the slurry cleansing device 32 and one end of the shaft 321 is connected to a speed-reducing motor 322 located at the open end of the G-shaped tank 31. Two driven shafts 323 are mounted at the bottom of the edge of the G-shaped tank 31. A combing roller 324 is mounted within the G-shaped tank 31 adjacent to the open end. A conveyor 325 passes through the driving shaft 321, the driven shafts 323 and the combing shaft 324 and is formed into an L-shaped arrangement. A scrape board 326 urges the driving shaft 321 and its bottom edge is connected to a holding board 327. By means of servo control, when the waste water within the G-shaped tank 31 has been accumulated for an appropriate period, the speed-reducing motor 322 initiates the driving shaft 321 to drive the driven shafts 323 and drive the conveyor 325. The slurry b on the conveyor 325 follows the L-shaped conveyor 325 to move forward.

The slurry b becomes loosen by the combing roller 324 and is scraped by the scrape board 326 to drop onto the holding board 327. A container c is located directly below the holding board 327 to collect the scraped slurry.

Figure 7:
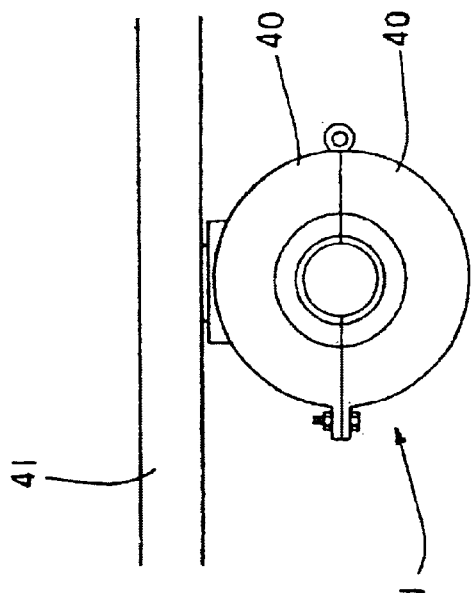
FIG. 7 is a top view showing the decomposition chamber which is detachable and can be separated in accordance with the present invention.

Referring to FIG. 7, the decomposition chamber 1 comprises two corresponding sections 40 which can be hingedly, detached or locked. The entire chamber 1 can be secured onto a frame or suspended by sliding rails 41 to facilitate cleaning and maintenance operation.

Figure 8:
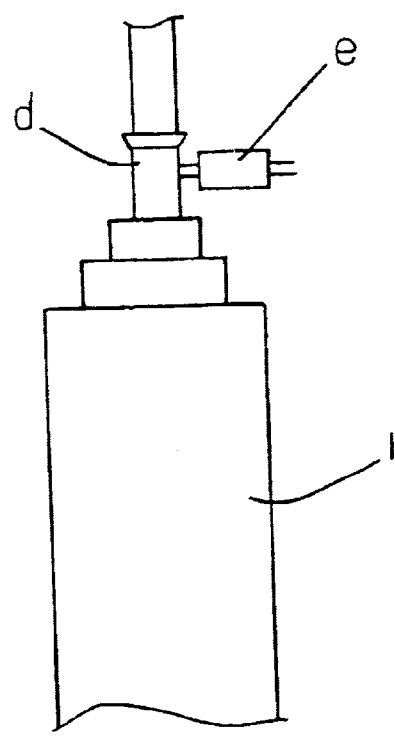
FIG. 8 is a schematic view of the decomposition chamber having mounted with an anti-air explosion device in accordance with the present invention.

Referring to FIG. 8, the tube end d of the waste gas intake tube of the decomposition chamber 1 can also be connected with an anti-gas explosion device e to provide a safety precaution to the decomposition chamber 1.

Figure 9:
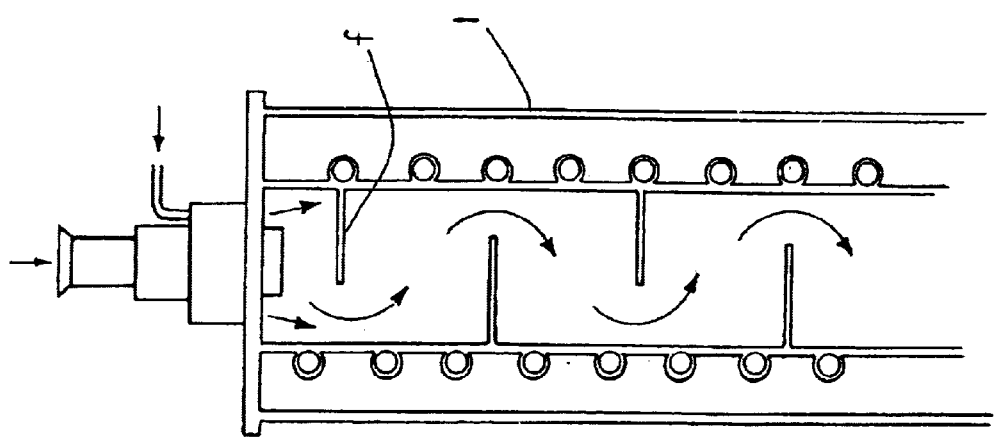
FIG. 9 is a sectional view showing the arrangement of the plurality of baffle plates within the interior of the decomposition chamber of the present invention.

Referring to FIG. 9, the interior of the decomposition chamber 1 is provided with a plurality of baffle plates f to reduce the flowing speed of the waste gas so as to maximum the effectiveness of decomposition of the waste gas.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An apparatus for treating waste gas from semiconductor manufacturing process comprising a decomposition chamber having an inner wall and having a heater therein, a cleansing chamber and a waste water treating device;

the inner wall of the decomposition chamber being mounted with a temperature sensor for servo control of the heater to operate at a constant temperature, and an aluminum foil layer to reflect heat to shorten decomposition time, the bottom end of the decomposition chamber being mounted with a detachable dust collector; the top section of the cleansing chamber being provided with a plurality of short metallic tubes to allow condensation of residual moisture of the discharged gas on the wall of the short metallic tubes, and the waste water treating device included a G-shaped tank mounted with a slurry removing device comprising a conveyor, a driving shaft, a driven shaft, a combing roller, a scrape board, and a speed-reducing motor, thereby precipitated slurries at the bottom of a storage tank is discharged.

2. An apparatus for treating waste gas from semiconductor manufacturing process as set forth in claim 1, wherein the conveyor of the waste water treating device is arranged in an L-shaped structure comprising a driving shaft, a driven shaft and a combing roller for pressing.

3. An apparatus for treating waste gas from semiconductor manufacturing process as set forth in claim 1, wherein the decomposition chamber comprises of two symmetrical portions which can be assembled, opened and locked, and the decomposition chamber is mounted on a fixing frame or supported by sliding rails.

4. An apparatus for treating waste gas from semiconductor manufacturing process as forth in claim 1, wherein a waste gas intake tube is mounted to the decomposition chamber and the end of the waste gas intake tube is connected to an anti-air explosion device.

5. An apparatus for treating waste gas from semiconductor manufacturing process as forth in claim 1, wherein the interior of the decomposition chamber is mounted with a plurality of alternatively arranged baffle plates.

* * * * *